United States Patent [19]
Fariello

[11] 3,878,337
[45] Apr. 15, 1975

[54] DEVICE FOR SPEECH DETECTION INDEPENDENT OF AMPLITUDE

[75] Inventor: Ettore Fariello, Gaithesburg, Md.

[73] Assignee: Communications Satellite Corporation, Washington, D.C.

[22] Filed: Mar. 13, 1970

[21] Appl. No.: 19,188

[52] U.S. Cl. .......................... 179/1 VC; 179/15 AS
[51] Int. Cl. .......................................... H04b 15/00
[58] Field of Search ... 179/15 A, 1 P, 1 VC, 15 AS, 179/15 BC; 340/146.2

[56] References Cited

UNITED STATES PATENTS

| | | | |
|---|---|---|---|
| 3,358,083 | 12/1967 | Helm | 179/15 BC |
| 3,369,080 | 2/1968 | Miller | 179/15 AS |
| 3,484,554 | 12/1969 | Gutleber | 179/15 BC |
| 3,508,007 | 4/1970 | Goodall | 179/15 AS |
| 3,520,999 | 7/1970 | May | 179/15 AS |
| 3,555,189 | 1/1971 | Quatse | 179/1 H F |

*Primary Examiner*—Kathleen H. Claffy
*Assistant Examiner*—Jon Bradford Leaheey
*Attorney, Agent, or Firm*—Alan J. Kasper; Martin C. Fliesler

[57] ABSTRACT

A method and apparatus for detecting the polarity of successive samples of voice signals and generating a pulse in response to a predetermined polarity sequence of successive samples occurring for a minimum duration of time. The sequence of polarity is either one positive sample followed by one negative sample for a minimum duration of 2 milliseconds or 16 samples of one sign followed by $x$ samples of the opposite sign, wherein $x$ may vary between 4 and 8, for a minimum duration of 3 milliseconds. Also, since the invention is amplitude insensitive, it is incorporated with and acts complementary to, an amplitude sensitive speech detection device.

18 Claims, 4 Drawing Figures

C = CLOCK
C.S. = CONTROL SET
C.R. = CONTROL RESET
$Q_{1,2,3}$ $Q'_{2,3}$ = OUTPUTS
$\overline{Q}_2$ , $\overline{Q'}_2$ = COMPLEMENTARY OUTPUT D.R. 1, 2, 3, 4 = DIRECT RESET
$Q_{16}$ = 4 TH COMPLEMENTARY OUTPUT
$Q_8$ = 3 RD OUTPUT
$\overline{Q}_{16}$ = 4 TH OUTPUT $I = \frac{B_1}{2}$ $II = \frac{B_1}{32}$

INVENTOR
ETTORE FARIELLO

BY

ATTORNEY

DEVICE FOR SPEECH DETECTION INDEPENDENT OF AMPLITUDE

BACKGROUND OF THE INVENTION

1. Field of the Invention

This invention relates to a method and apparatus for detecting speech in the presence of noise.

2. Description of the Prior Art

There are many applications where it is desirable to operate a device in response only to voice signals and not noise. For example, in communications systems, the efficiency of the system can be improved through power conservation if energization of a transmitter occurs only in response to a detector capable of distinguishing intelligible signals, i.e. voice, from noise. This technique is particularly advantageous in satellite communications systems since power consumption is one of the controlling factors in determining the number of voice channels that may be employed.

Most prior art detectors are analog rather than digital in nature. Some of these devices operate on the principle that for various words there will be a certain number of zero-crossings, i.e. the number of times a signal crosses a reference axis, within a given time interval. By counting the total number of zero-crossings in a given time interval an analysis of the waveform can be made in order to distinguish a voice signal from noise. A major disadvantage of these devices in their ability to distinguish voice from noise is that unwanted noise will produce spurious zero-crossings.

Since noise is usually of a small amplitude in comparison to the amplitude of speech, to overcome the above disadvantage other prior art detectors employ reference axes of positive and negative amplitudes greater than the amplitude of noise rather than employing a reference axis of zero amplitude. These devices may improve the ability to distinguish voice signals from noise, however, they are incapable of detecting voice signals of low amplitude and they do not operate as quickly as the present digital detector. This will result in the clipping off of words at the initiation of speech.

Other prior art analog devices operate on the principle that various letters have an acoustic spectrum wherein the greater part of the sound energy is contained in certain frequency components of the particular letter. For example, the semi-vowel *m* has its greatest energy content in the lower frequency components. These devices will compare the energy content of the various frequencies of *m* and if most of the energy is in the lower frequencies there will then be an output response indicative of voice. Besides having the time delay problem inherent in analog systems which detect energy content, these devices, being amplitude sensitive, suffer from the probabilities of unwanted detection due to the possibility of loud background noise. As a result there is difficulty in properly distinguishing voice from noise.

SUMMARY OF THE INVENTION

The present invention comprises a speech detector which operates in the digital mode and is amplitude insensitive. An analog voice signal is pulse code modulated (PCM) by a PCM encoder into a plurality of PCM words of *n* bit length with the first bit of each PCM word representing the sign (+or −) of the word or sample. Each PCM word is then fed to a digital detector which detects the sequence of sign of successive PCM words. The digital detector or, as hereinafter referred to, voice sign sequence detector, will then emit a pulse each time a particular sequence of signs is detected.

The waveform of most voice signals has periodic variations different from that of noise. That is, encoded noise signals will produce a variation of signs of successive PCM words distinct from that of most voice signals. Because the voice sign sequence detector looks for a certain periodicity indicative only of voice it is very insensitive to noise. Further, since the detector looks for periodicity no threshold is used, thereby enabling detection of voice signals of extremely low amplitude. Thus, the voice sign sequence detector, being digital in nature and amplitude insensitive, will greatly improve performance over prior art devices in terms of detection of low amplitude signals, detection delay and noise rejection.

The voice sign sequence detector of the present invention is formed by two circuits. A first circuit is triggered only by those letters, such as the pure sibilants *s* and *z*, which have their frequency power distribution in the upper part of the voice bandwidth, i.e. 3 kHz to 3.4 kHz. The second circuit is triggered only by those letters (e.g. the semi-vowels *l*, *m*, *n* and the stop consonants *b*, *d*, *g*, *p*, *k*) which have their frequency power distribution allocated in the lower part of the voice bandwidth. The first circuit can be considered to be a very narrow bandpass filter and the second circuit a low-pass filter.

With respect to the first circuit, or narrow bandpass filter, a 4 kHz sine wave when sampled at a rate of 8 kHz, or once every 125 μsec, will produce a sequence of one positive sample followed by one negative sample for an infinite time. A signal with a narrow bandwidth and with a center frequency of 4 kHz will have this sequence of one positive and one negative sample for a long, but not infinite, time. For a short time, this signal will have sign sequence characteristics other than one positive followed by one negative. This means that the wider the bandwidth is and the further the center frequency of the signal is from 4 kHz, the shorter is the duration of the sign sequence referred to above, i.e. one positive followed by one negative.

The pure sibilants have a frequency power distribution centered in the upper part of the voice bandwidth with a central frequency which is closer to 4 kHz than, for example, the central frequency of Gaussian telephone line noise. Therefore, the duration of the sequence of one positive followed by one negative sample is greater for these letters than for noise. The duration of the former will last for more than 2 msec whereas the latter will last for somewhat less than 2 msec. Therefore, by fixing an observation time of the voice sign sequence detector of 2 msec before triggering there will be complete protection from noise triggering.

The second circuit is triggered by the signal only when 16 samples of one sign are followed by at least $x$ samples of the opposite sign where the value of $x$ may vary between 4 and 8. It will also trigger when $x$ samples of one sign are followed by 16 samples of the opposite sign. These conditions correspond to a very low frequency. The semi-vowels (e.g., 1, m) and stop consonants (e.g., *b*, *d*, *g*, *p* and *k*) have their frequency power distribution allocated in the lower part of the voice bandwidth and will therefore produce such a sign sequence, whereas Gaussian telephone line noise will almost never produce such a sequence. Because of the characteristics of the circuits, no threshold is necessary and the detection occurs substantially at the onset of the voice signal.

A method and apparatus employing threshold detection in a digital voice detector is disclosed in the copending U.S. Pat. application of Ettore Fariello, entitled "Method and Apparatus for Detecting Speech Signals in the Presence of Noise," Ser. No. 19184, filed Mar. 13, 1970 and assigned to the assignee of the present invention, and now U.S. Pat. No. 3,712,959. As disclosed in the above application a PCM encoded voice signal is fed to a digital comparator where each digitally coded, instantaneous amplitude sample is compared with a digital code word corresponding to the selected threshold level in a digital comparator. Whenever one of the voice signal samples equals or exceeds the threshold level, an output is produced indicative of voice.

The above circuit described in the copending application to Fariello, rather than detecting signals with average or RMS power greater than a set threshold, detects instantaneous amplitude samples whose levels are above a threshold. This is a further technique of distinguishing voice from noise, and relies on the fact that for equal RMS powers of voice and noise, the probability of voice signals exceeding a given threshold level is far greater than that of noise signals. This margin between voice and noise is as large as the peak to RMS ratio of the various letters. The margin between voice and noise triggering is greater for those letters, such as stop consonants and vowels, whose peak to RMS ratio is large and is smaller for those letters, such as semi-vowels and the pure sibilants, whose peak to RMS ratio is small.

The voice sign sequence detector of the present invention therefore may be used in a complementary manner with the voice detector described above in order to detect those letters with lower peak to RMS ratio such as the semi-vowel and pure sibilants. Therefore, the detection circuits of the above copending application and the present application taken together are extremely sensitive for all voice signals.

Though the specific embodiment of the present invention is set to detect the sequence of sign of the sibilants, the stop consonants and the semi-vowels with complete rejection of noise, it is to be realized that all other letters have a certain periodicity which will produce their own sequence of signs of successive PCM words. The specific embodiment of this invention could therefore be modified by one skilled in the art in order to detect any particular sign sequence for proper voice detection. However, there would not be a complete rejection of noise, because the sign sequence of some of the other letters would be very similar to the sign sequence of noise. This happens for those letters whose frequency power distribution is located in the middle part of the voice bandwidth.

DESCRIPTION OF THE PREFERRED EMBODIMENT

Figure 1:
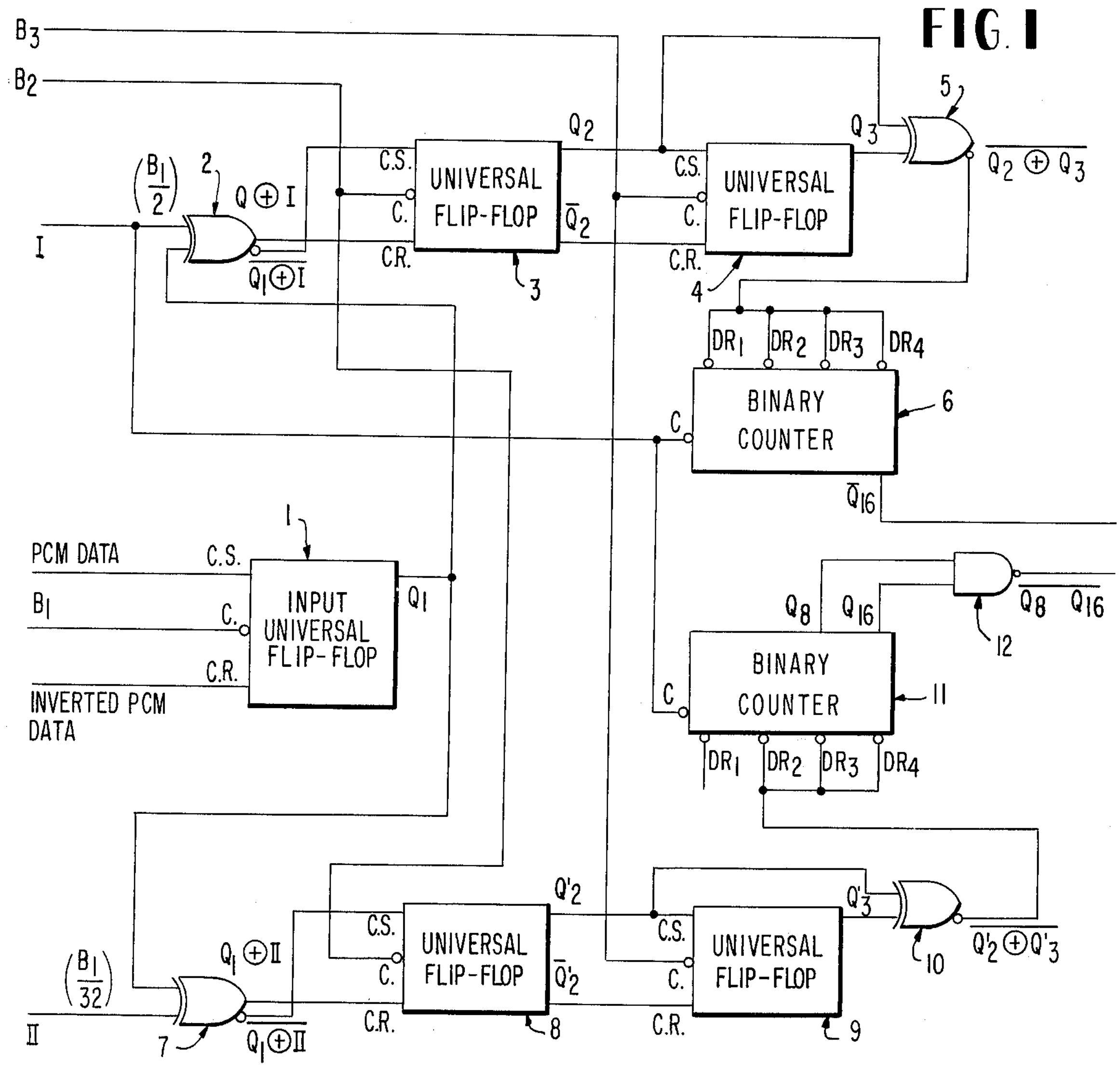
FIG. 1 is a logic diagram of both the high frequency and low frequency circuits of the voice sign sequence detector.

Referring to FIG. 1, the upper half of the drawing shows that part of the voice sign sequence detector which detects voice signals in the high frequency range whereas the lower half of the drawing shows that part of the voice sign detector which detects voice signals in the low frequency range.

An analog input signal is sampled at the rate of 8 kHz or once every 125 μsec and digitally encoded by a standard PCM encoder (not shown) into a series of successive PCM words of $n$ bit length with the first bit of each PCM word representing the sign (positive or negative) of the sample. The PCM data is then clocked into input universal flip-flop 1 by clock $B_1$. Clock $B_1$ is phased with the first bit (the sign bit) of each PCM word. Universal input flip-flop 1 will produce output $Q_1$ each time the clock $B_1$ is in phase with a PCM word whose sign or first bit is positive. The output $Q_1$ will assume the 1 state if the sign of the PCM word is positive and the 0 state if the sign of the PCM word is negative as can be seen from the timing diagram of FIG. 2.

Figure 2:
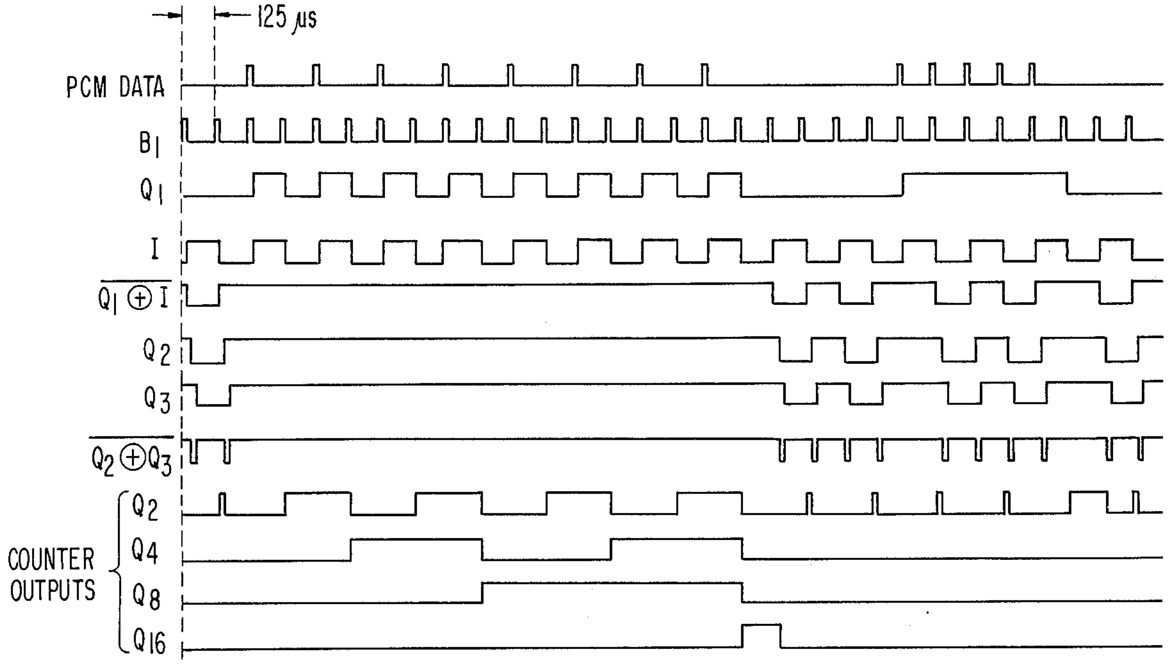
FIG. 2 is a timing diagram of the high frequency voice sign sequence detector.

With respect to the high frequency voice sign sequence circuit, output $Q_1$ is compared with wavefore I of FIG. 2 in Exclusive-OR logic 2. Wavefore I is provided by a clock equal to $B_1/2$ or 4 kHz. Output $Q_1$ will equal wavefore I if one PCM word of positive sign is followed by another PCM word of the opposite sign. Each time output $Q_1$ and waveform I are coincident the negative output of Exclusive-OR logic 2 wil go to the 1 state. Each time output $Q_1$ and waveform I are not coincident the negative output of Exclusive-OR logic 2 will go to the 0 state.

This means that if the output of Exclusive-OR logic 2 remains 0 or 1 the sequence of the sign of successive PCM words will be one positive and one negative at a rate of 125 μsec. In fact, under the condition of a sequence of signs of one positive and one negative, output $Q_1$ will have the same rate as waveform I and is coincident to I or $\bar{I}$ wherein $\bar{I}$ is the complementary of I, when a positive PCM word is followed by a negative PCM word. That is, the output $\overline{Q_1 \oplus I}$ of Exclusive-OR logic 2 remains 1 or 0 as can be seen from the timing diagram of FIG. 2.

Output $\overline{Q_1 \oplus I}$ is then reclocked into universal flip-flop 3 by clock $B_2$ (where $B_2$ has the same rate as $B_1$ but is phased with the second bit of the PCM word) to provide output $Q_2$ as shown in FIG. 2. This is done in order to eliminate spikes due to propagation delay occurring during the state changes of output $Q_1$ and waveform I. Output $Q_2$ is then clocked into universal flip-flop 4 by clock $B_3$, wherein $B_3$ has the same rate as $B_2$ but is delayed by one bit with respect to clock $B_2$. Output $Q_2$ is also fed into Exclusive-OR logic 5. Flip-flop 4 delays output $Q_2$ by one bit to produce output $Q_3$. Outputs $Q_2$ and $Q_3$ are then compared in Exclusive-OR logic 5 to produce output $\overline{Q_2 \oplus Q_3}$. Output $\overline{Q_2 \oplus Q_3}$ will have negative pulses only when output $Q_2$ changes state as shown in FIG. 2.

Output $\overline{Q_2 \oplus Q_3}$ is then fed to the direct reset of binary counter 6. Binary counter 6 is reset each time $Q_2$ changes state and is clocked by clock $B_1/2$ or 4 kHz. Output $\overline{Q_{16}}$ of binary counter 6 will have a negative pulse only if output $Q_1$ of universal input flip-flop 1 is coincident to clock I, or to $\overline{I}$, for a period equal to $1/\ \times 10^3 \times 2^4/2$ sec.=2 msec, where the first term equals the inverse of the frequency and the counter 6. That is, when the voice sign sequence of one positive followed by one negative is maintained for at least 2 msec it will be an indication that voice is present and binary counter 6 will produce output $\overline{Q_{16}}$ to indicate the presence of voice.

Figure 3:
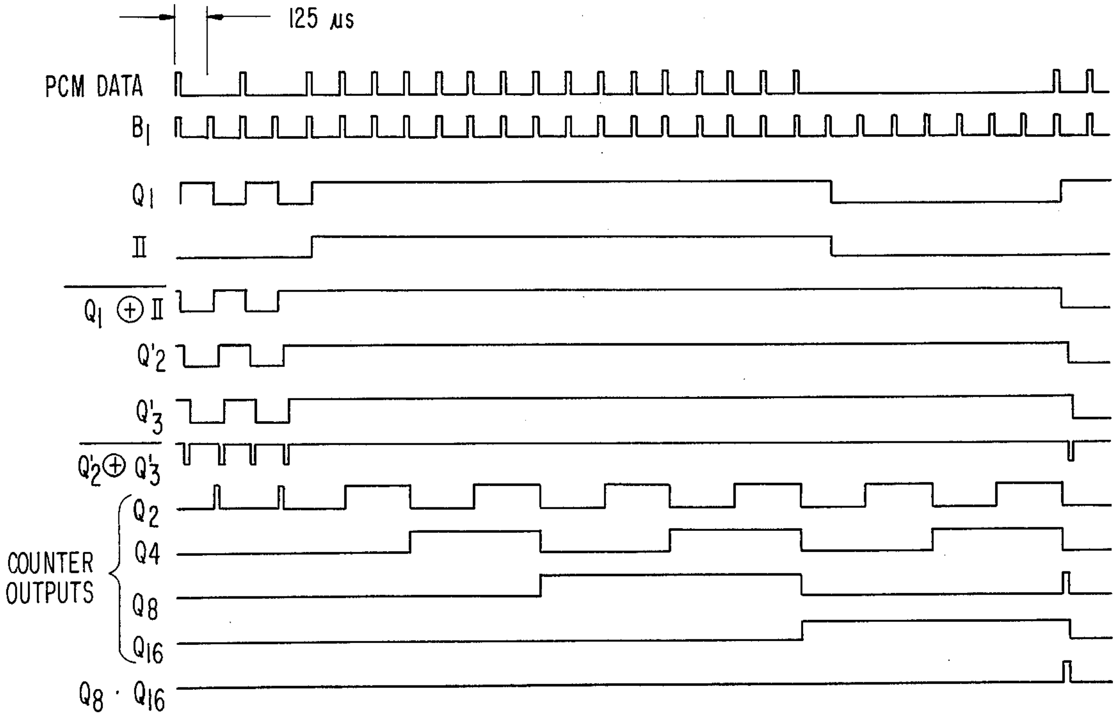
FIG. 3 is a timing diagram of the low frequency voice sign sequence detector.

The lower part of FIG. 1 shows the low frequency voice sign sequence detector logic diagram. FIG. 3 shows the timing diagram of this circuit. The low frequency detection circuit is similar to the high frequency circuit described above except that the frequency of the waveform compared with output $Q_1$ is different as is the duration of the observation time.

If a voice signal of low frequency is being sampled at the rate of 8 kHz or once every 125 $\mu$sec the PCM data will have a series of successive PCM words whose sign is positive followed by a series of successive PCM words whose sign is negative. This data will then be clocked by positive frame clock $B_1$ into universal input flip-flop 1 to produce output $Q_1$ of the timing diagram of FIG. 3.

Output $Q_1$ is then compared with waveform II of FIG. 3 in Exclusive-OR logic 7. Waveform II is equal to clock $B_1/32$. Output $Q_1$ will equal waveform II if 16 PCM words with the same sign are followed by 16 PCM words of the opposite sign.

Output $Q_1$ is processed in the same manner as discussed previously. Each time output $Q_1$ and waveform II are not coincident the output $\overline{Q_1 \oplus II}$ of Exclusive-OR logic 7 will go to the "0" state. If the output $Q_1$ and waveform II are coincident the output $\overline{Q_1 \oplus II}$ of Exclusive-OR logic 7 will go to the "1" state. Thus, if the output $\overline{Q_1 \oplus II}$ of the Exclusive-OR logic 7 remains "0" or "1" the sequence of sign of successive PCM words will be 16 positive followed by 16 negative.

Output $\overline{Q_1 \oplus II}$ is then reclocked into universal flip-flop 8 by clock $B_2$ to provide output $Q_2'$ as shown in FIG. 3, thereby eliminating spikes as discussed previously. Output $Q_2'$ is then clocked both into flip-flop 9 and Exclusive-OR logic 10. Flip-flop 9 delays output $Q_2'$ by one bit to produce output $Q_3'$. Outputs $Q_2'$ and $Q_3'$ are then compared in Exclusive-OR logic 10 to produce output $\overline{Q_2' \oplus Q_3'}$. Output $\overline{Q_2' \oplus Q_3'}$ will have negative pulses only when output $Q_2'$ changes state as shown in Figure 3. Output $\overline{Q_2' \oplus Q_3'}$ is then fed to the direct reset of binary counter 11. Binary counter 11 is clocked in the same manner as binary counter 6, i.e. $B_1/2$ or 4 kHz. The third output $Q_3$, and fourth output $Q_{16}$ of binary counter 11 are fed to logical "NAND" 12. In this manner logical NAND 12 will produce a negative pulse $\overline{Q_8 Q_{16}}$ if the coincidence between output $Q_1$ and waveform II lasts at least 3 msec, that is for 24 PCM frames. In this way it would be sufficient that 16 PCM words of one sign are followed by only 8 PCM words of opposite sign, or vice-versa, to have a pulse at the output of the low frequency voice sign sequence detector. That is, a detection of this sequence would be sufficient to distinguish voice from noise.

The first stage of binary counter 11 is never reset, i.e. direct reset $DR_1$ is disconnected. The consequence of this is that the coincidence between $Q_1$ and waveform II has to last a minimum time interval which is statistically variable between 20 and 24 frames. That is, as comparison waveform II of the low frequency voice sign sequence detector changes its state every 16 PCM frames, the sum of the PCM words of equal sign and the number of the following words of the opposite sign must be at least 20 to 24 in order to be assured of proper voice detection and noise rejection.

Figure 4:
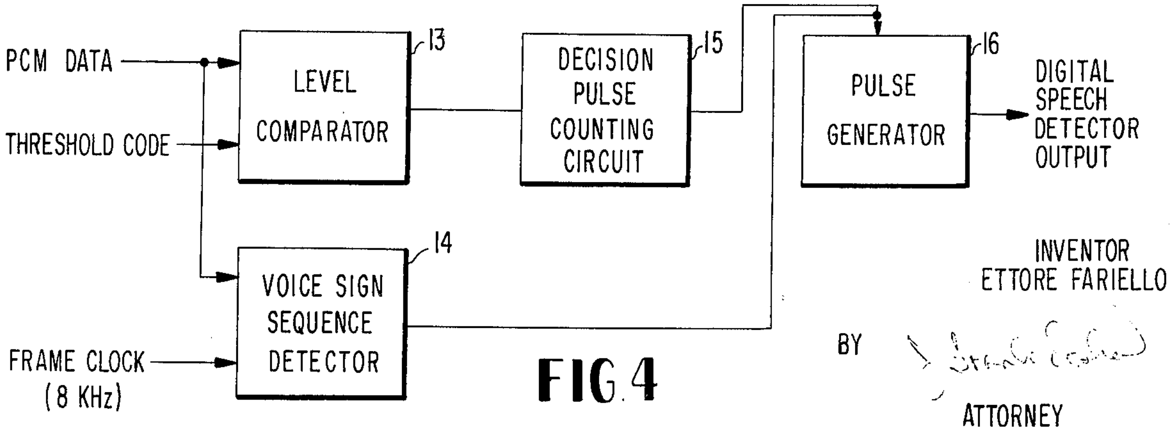
FIG. 4 shows a block diagram of a digital speech detector of the type disclosed in the previous mentioned copending application and the voice sign sequence detector of the present invention.

In the block diagram of FIG. 4 the PCM word is fed to a level comparator 13 and to the voice sign sequence detector 14. The output of comparator 13 is fed to decision pulse counting circuit 15. The outputs of counting circuit 15 and detector 14 are then logically OR ed at the input of pulse generator circuit 16. Upon receiving a pulse the pulse generator 16 will then energize a transmitter.

The level comparator 13 will compare digitally the sample amplitude of a signal to a coded threshold level. Each time the sample amplitude equals or exceeds the threshold level a pulse is emitted. The decision pulse counting circuit 15 produces an output only after a predetermined number of uninterrupted, consecutive pulses have been received from comparator 13.

The voice sign sequence detector 14, therefore, being amplitude insensitive, operates in a manner complementary to level comparator 13. In the event that the incoming signal has an amplitude below the threshold level of comparator 13 the detector 14 will check the periodicity of the signal and emit a signal when voice is present in order to trigger pulse generator 16, thereby energizing a transmitter.

What is claimed is:

1. A method for detecting a speech signal in the presence of noise independent of the amplitude of said speech signal wherein said speech signal is sampled into a plurality of samples each sample having a characteristic sign represented by a binary 1 or a binary 0, comprising:

a. detecting the sign of each successive sample;

b. determining the presence of a predetermined sequence of signs characteristic of said successive samples, said sequence comprising a mixture of the sign represented by a binary 1 and the sign represented by a binary 0; and c. generating a pulse, indicative of speech, when said predetermined sequence of signs is present for a predetermined period of time.

2. The method of claim 1 wherein the step of determining comprises:

a. generating a reference waveform corresponding to the predetermined sign sequence; and b. comparing said reference waveform to the detected sign sequence.

3. The method of claim 1 wherein the predetermined sign sequence is one sample of one sign followed by one sample of the other sign.

4. The method of claim 3 wherein the predetermined period of time is 2 milliseconds.

5. The method of claim 2 wherein the predetermined sign sequence is 16 signs of one binary value followed by $x$ signs of the other binary value wherein $x$ may vary between 4 and 8.

6. The method of claim 2 wherein the predetermined sign sequence is $x$ signs of one binary value followed by 16 signs of the other binary value wherein $x$ may vary between 4 and 8.

7. Apparatus for detecting a speech signal in the presence of noise independent of the amplitude of said speech wherein speech signal is sampled into a plurality of samples each sample having a characteristic sign represented by a binary 1 or a binary 0, comprising:

a. means for detecting the sign of each successive sample;

b. means, connected to said detecting means, for determining the presence of a predetermined sequence of signs characteristic of said successive samples, said sequence comprising a mixture of the sign represented by a binary 1 and the sign represented by a binary 0; and c. means, connected to said determining means, for generating a pulse indicative of speech when said predetermined sequence of signs is present for a predetermined period of time.

8. The apparatus of claim 7 wherein said means for determining comprises:

a. means for generating a reference waveform corresponding to the predetermined sign sequence; and b. means for comparing said reference waveform to the detected sign sequence.

9. The apparatus of claim 8 wherein the predetermined sign sequence is one sign of one binary value followed by one sign of the other binary value.

10. The apparatus of claim 9 wherein the predetermined period of time is 2 milliseconds.

11. The apparatus of claim 8 wherein the predetermined sign sequence is 16 signs of one binary value followed by $x$ signs of the, other binary value, wherein $x$ may vary between 4 and 8.

12. The apparatus of claim 8 wherein the predetermined sequence of signs is $x$ signs of one binary value followed by 16 signs of the, other binary value wherein $x$ may vary between 4 and 8.

13. A method for detecting a speech signal in the presence of noise wherein the speech signal is sampled into a plurality of samples and each sample is digitally encoded into a pulse code modulated (PCM) word of $n$-bit length wherein one bit of the code word represents the sign of the speech sample, comprising:

a. generating a reference waveform having a predetermined sign sequence;

b. generating a clock signal phased with the sign bit of each code word;

c. comparing said clock signal with the sign bit of each code word;

d. generating a first output signal each time the clock signal is compared with a code word representing the same sign of the sample;

e. comparing said first output signal to said reference waveform; and f. generating a pulse indicative of speech when said reference waveform and said first output signal correspond for a predetermined minimum period.

14. The method of claim 13 wherein the step of generating a pulse comprises.

a. generating a response signal each time said first output signal and said reference waveform correspond;

b. delaying said response signal to produce a delayed response signal;

c. comparing said response signal with said delayed response signal to produce a second output signal until such time as said response signal changes state; and d. detecting the duration of said second output signal.

15. The method of claim 14 wherein said predetermined minimum period is 2 milliseconds.

16. The method of claim 14 wherein said predetermined minimum period is 3 milliseconds.

17. Apparatus for detecting a speech signal in the presence of noise wherein the speech signal is sampled into a plurality of samples and each sample is digitally encoded into a pulse code modulated (PCM) word of $n$-bit length wherein one bit of the code word represents the sign of the speech sample, comprising:

a. means for generating a reference waveform having a predetermined sign sequence;

b. means for generating a clock signal phased with the sign bit of each code word;

c. means for comparing said clock signal with the sign bit of each code word;

d. means for generating a first output signal each time the clock signal is compared with a code word representing the same sign of the sample;

e. means for comparing said first output signal and said reference waveform; and f. means for generating a pulse indicative of speech when said reference waveform and said first output signal correspond for a predetermined minimum period.

18. The apparatus of claim 17 wherein said means for generating a pulse comprises:

a. means for generating a response signal each time said first output signal and said reference signal correspond;

b. means for delaying said response signal to produce a delayed response signal;

c. means for comparing said response signal to said delayed response signal to produce a second output signal until such time as said response signal changes state; and d. means for detecting the duration of said second output signal.

* * * * *